United States Patent
Genda et al.

(10) Patent No.: US 8,577,850 B1
(45) Date of Patent: Nov. 5, 2013

(54) TECHNIQUES FOR GLOBAL DATA DEDUPLICATION

(75) Inventors: Jon Genda, Rogers, MN (US); Graham Bromley, Dublin, CA (US); Walter Angerer, Maple Grove, MN (US)

(73) Assignee: Symantec Corporation, Mountain View, CA (US)

( * ) Notice: Subject to any disclaimer, the term of this patent is extended or adjusted under 35 U.S.C. 154(b) by 185 days.

(21) Appl. No.: 12/946,500

(22) Filed: Nov. 15, 2010

(51) Int. Cl.
*G06F 17/30* (2006.01)

(52) U.S. Cl.
USPC .......................................................... 707/692

(58) Field of Classification Search
USPC .......................................... 707/634, 661, 692
See application file for complete search history.

(56) References Cited

U.S. PATENT DOCUMENTS

| | | | | |
|---|---|---|---|---|
| 8,060,715 | B2 * | 11/2011 | Cremelie et al. | 711/162 |
| 8,180,740 | B1 * | 5/2012 | Stager et al. | 707/692 |
| 8,468,320 | B1 * | 6/2013 | Stringham | 711/170 |
| 2008/0005141 | A1 * | 1/2008 | Zheng et al. | 707/101 |
| 2008/0294696 | A1 * | 11/2008 | Frandzel | 707/200 |
| 2010/0037118 | A1 * | 2/2010 | Saliba et al. | 714/752 |
| 2010/0042790 | A1 * | 2/2010 | Mondal et al. | 711/161 |
| 2010/0114833 | A1 * | 5/2010 | Mu | 707/650 |
| 2010/0250858 | A1 * | 9/2010 | Cremelie et al. | 711/136 |
| 2010/0312752 | A1 * | 12/2010 | Zeis et al. | 707/640 |
| 2011/0022825 | A1 * | 1/2011 | Spackman | 712/240 |
| 2011/0099154 | A1 * | 4/2011 | Maydew et al. | 707/692 |
| 2012/0030477 | A1 * | 2/2012 | Lu et al. | 713/189 |

OTHER PUBLICATIONS

Graham Bromley, et al., Application for Letters Patent, "Systems and Methods for Migrating an Object From a Deduplication Store to an External Domain," U.S. Appl. No. 12/487,955; filed Jun. 19, 2009; 48 pages.

* cited by examiner

*Primary Examiner* — Cam-Linh Nguyen
(74) *Attorney, Agent, or Firm* — Wilmer Cutler Pickering Hale and Dorr LLP

(57) ABSTRACT

Techniques for data deduplication are disclosed. In one particular exemplary embodiment, the techniques may be realized as a method for data deduplication comprising receiving a write request for a unit of data, generating a fingerprint for the unit of data, transmitting at least a portion of the fingerprint to a plurality of deduplication monitors, performing the write request using an indicator indicating a location of a previously stored unit of data having a fingerprint matching the transmitted at least a portion of the fingerprint if a response indicating the previously stored unit of data having the fingerprint matching the transmitted at least a portion of the fingerprint is received from at least one of the plurality of deduplication monitors, and performing the write request using the unit of data if no response is received.

20 Claims, 6 Drawing Sheets

TECHNIQUES FOR GLOBAL DATA DEDUPLICATION

FIELD OF THE DISCLOSURE

The present disclosure relates generally to data deduplication and, more particularly, to techniques for global data deduplication.

BACKGROUND OF THE DISCLOSURE

With the increased demand for storage such as, for example, cloud-based storage, the importance of data deduplication to save storage has increased. Data deduplication may be used on backups and other implementations where data integrity may be critical. Deduplication metadata may be stored which may indicate where one or more portions of data for a backup is located. Loss of deduplication metadata may corrupt the data and prevent restoration and/or use of the data. Additionally, data deduplication may be performed within a specific subset of data (e.g., a data domain). Thus, as the amount of data increases, duplicate data across multiple subsets of data increases.

In view of the foregoing, it may be understood that there may be significant problems and shortcomings associated with current technologies for data deduplication.

SUMMARY OF THE DISCLOSURE

Techniques for data deduplication are disclosed. In one particular exemplary embodiment, the techniques may be realized as a method for data deduplication comprising receiving a write request for a unit of data, generating a fingerprint for the unit of data, transmitting at least a portion of the fingerprint to a plurality of deduplication monitors, performing the write request using an indicator indicating a location of a previously stored unit of data having a fingerprint matching the transmitted at least a portion of the fingerprint if a response indicating a previously stored unit of data having a fingerprint matching the transmitted at least a portion of the fingerprint is received from at least one of the plurality of deduplication monitors, and performing the write request using the unit of data if no response is received.

In accordance with other aspects of this particular exemplary embodiment, transmitting at least a portion of the fingerprint to a plurality of deduplication monitors may comprise broadcasting at least a portion of the fingerprint to a plurality of deduplication monitors.

In accordance with further aspects of this particular exemplary embodiment, transmitting at least a portion of the fingerprint to a plurality of deduplication monitors may comprise sending at least a portion of the fingerprint to a control monitor and transmitting at least a portion of the fingerprint from a control monitor to a plurality of deduplication monitors.

In accordance with additional aspects of this particular exemplary embodiment, a plurality of responses may be received from at least two of the plurality of deduplication monitors.

In accordance with additional aspects of this particular exemplary embodiment, the techniques may comprise requesting a full fingerprint to verify the unit of data is stored from the at least two of the plurality of deduplication monitors.

In accordance with additional aspects of this particular exemplary embodiment, the fingerprint may comprise a hash key.

In accordance with additional aspects of this particular exemplary embodiment, each of the plurality of deduplication monitors may comprise a monitor for a data domain and data deduplication is provided across a plurality of domains.

In accordance with additional aspects of this particular exemplary embodiment, the fingerprint may be generated and transmitted from a client plug-in.

In accordance with additional aspects of this particular exemplary embodiment, the client may comprise a media server.

In accordance with additional aspects of this particular exemplary embodiment, the indicator indicating a location of a previously stored unit of data may allow data written with the indicator to be migrated or restored without use of deduplication metadata.

In accordance with additional aspects of this particular exemplary embodiment, the indicator indicating a location of a previously stored unit of data may allow data written with the indicator to be migrated or restored without use of one or more of the plurality of deduplication monitors.

In accordance with additional aspects of this particular exemplary embodiment, implementation of deduplication may be capable of being performed on storage without affecting existing data on the storage.

In accordance with additional aspects of this particular exemplary embodiment, the number of the plurality of deduplication monitors may be configurable In accordance with additional aspects of this particular exemplary embodiment, loss of one or more deduplication components may not affect data protection.

In accordance with additional aspects of this particular exemplary embodiment, each of the plurality of deduplication monitors may maintain a table of one or more fingerprints.

In accordance with additional aspects of this particular exemplary embodiment, the write request may comprise a portion of a stream of backup data.

In accordance with additional aspects of this particular exemplary embodiment, a counter may be maintained for a unit of storage referenced by other storage and the unit of storage is deallocated only in the event the counter indicates no other storage is referencing the unit of storage.

In accordance with additional aspects of this particular exemplary embodiment, the techniques may be realized as at least one non-transitory processor readable storage medium for storing a computer program of instructions configured to be readable by at least one processor for instructing the at least one processor to execute a computer process for performing the method.

In another particular exemplary embodiment, the techniques may be realized as an article of manufacture for data deduplication, the article of manufacture comprising at least one non-transitory processor readable medium, and instructions stored on the at least one medium. The instructions may be configured to be readable from the at least one medium by at least one processor and thereby cause the at least one processor to operate so as to receive a write request for a unit of data, generate a fingerprint for the unit of data, transmit at least a portion of the fingerprint to a plurality of deduplication monitors, perform the write request using an indicator indicating a location of a previously stored unit of data having a fingerprint matching the transmitted at least a portion of the fingerprint if a response indicating the previously stored unit of data having the fingerprint matching the transmitted at least a portion of the fingerprint is received from at least one of the plurality of deduplication monitors, and perform the write request using the unit of data if no response is received.

In yet another particular exemplary embodiment, the techniques may be realized as a system for data deduplication comprising one or more processors communicatively coupled to a network, wherein the one or more processors are configured to receive a write request for a unit of data, generate a fingerprint for the unit of data, transmit at least a portion of the fingerprint to a plurality of deduplication monitors, perform the write request using an indicator indicating a location of a previously stored unit of data having a fingerprint matching the transmitted at least a portion of the fingerprint if a response indicating the previously stored unit of data having the fingerprint matching the transmitted at least a portion of the fingerprint is received from at least one of the plurality of deduplication monitors, and perform the write request using the unit of data if no response is received.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
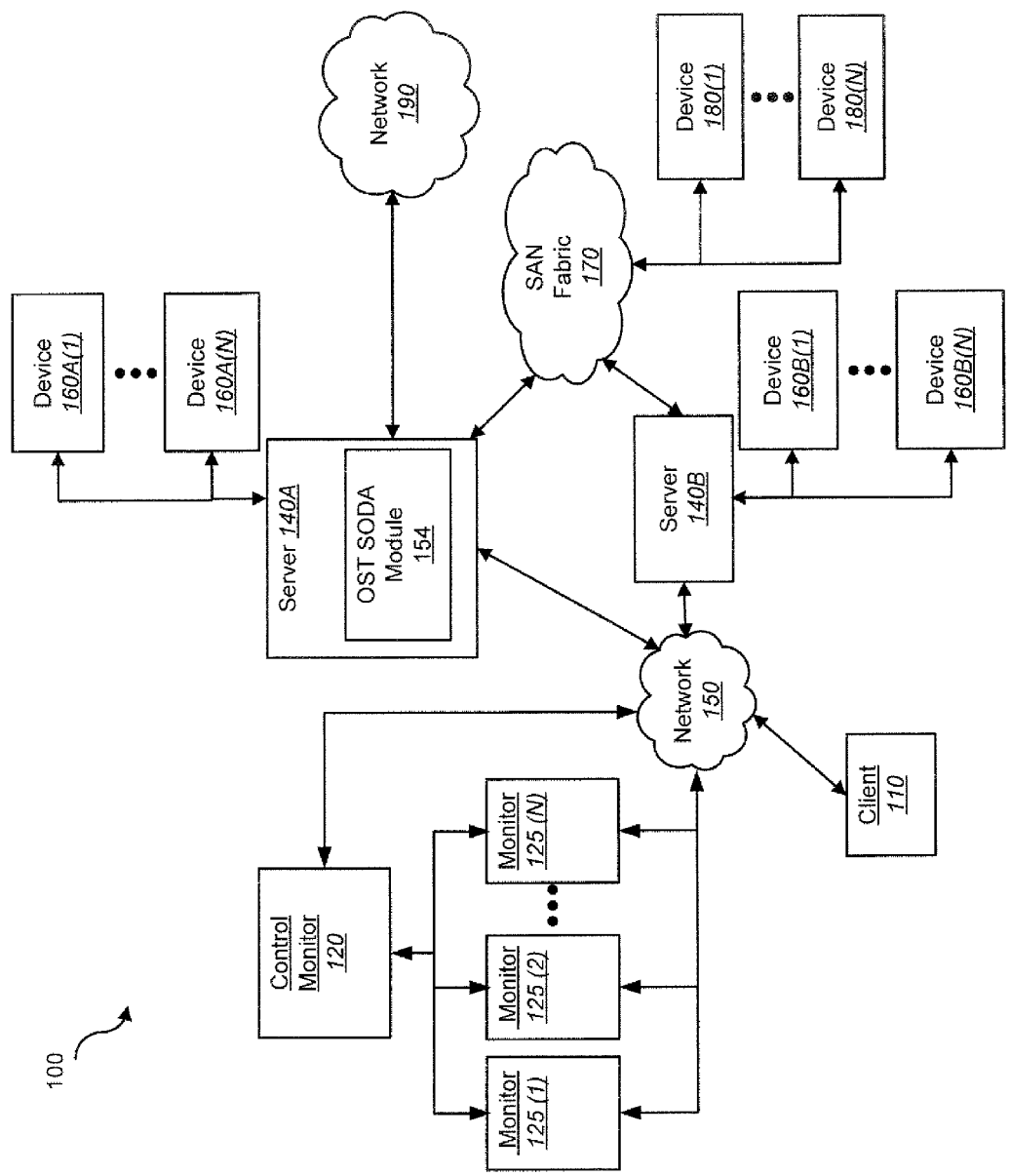
FIG. 1 shows a block diagram depicting a network architecture containing a platform for data deduplication in accordance with an embodiment of the present disclosure.

FIG. 1 shows a block diagram depicting a network architecture 100 for data deduplication in accordance with an embodiment of the present disclosure. FIG. 1 is a simplified view of network architecture 100, which may include additional elements that are not depicted. Network architecture 100 may contain client system 110 as well as servers 140A and 140B (one or more of which may be implemented using computer system 200 shown in FIG. 2). Client system 110 may be communicatively coupled to a network 150. Server 140A may be communicatively coupled to storage devices 160A(1)-(N), and server 140B may be communicatively coupled to storage devices 160B(1)-(N).

The description below describes network elements, computers, and/or components of a system and method for data deduplication that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Servers 140A and 140B may contain a deduplication module (e.g., OST (Open Storage Technology) SODA (Secure Optimized Deduplication Assist) module 142 of server 140A). Servers 140A and 140B may be communicatively coupled to a SAN (Storage Area Network) fabric 170. SAN fabric 170 may support access to storage devices 180(1)-(N) by servers 140A and 140B, and by client system 110 via network 150. Server 140A may be communicatively coupled to network 190. Deduplication monitors such as control monitor 120 and monitors 125 may also be communicatively coupled to network 150.

Figure 2:
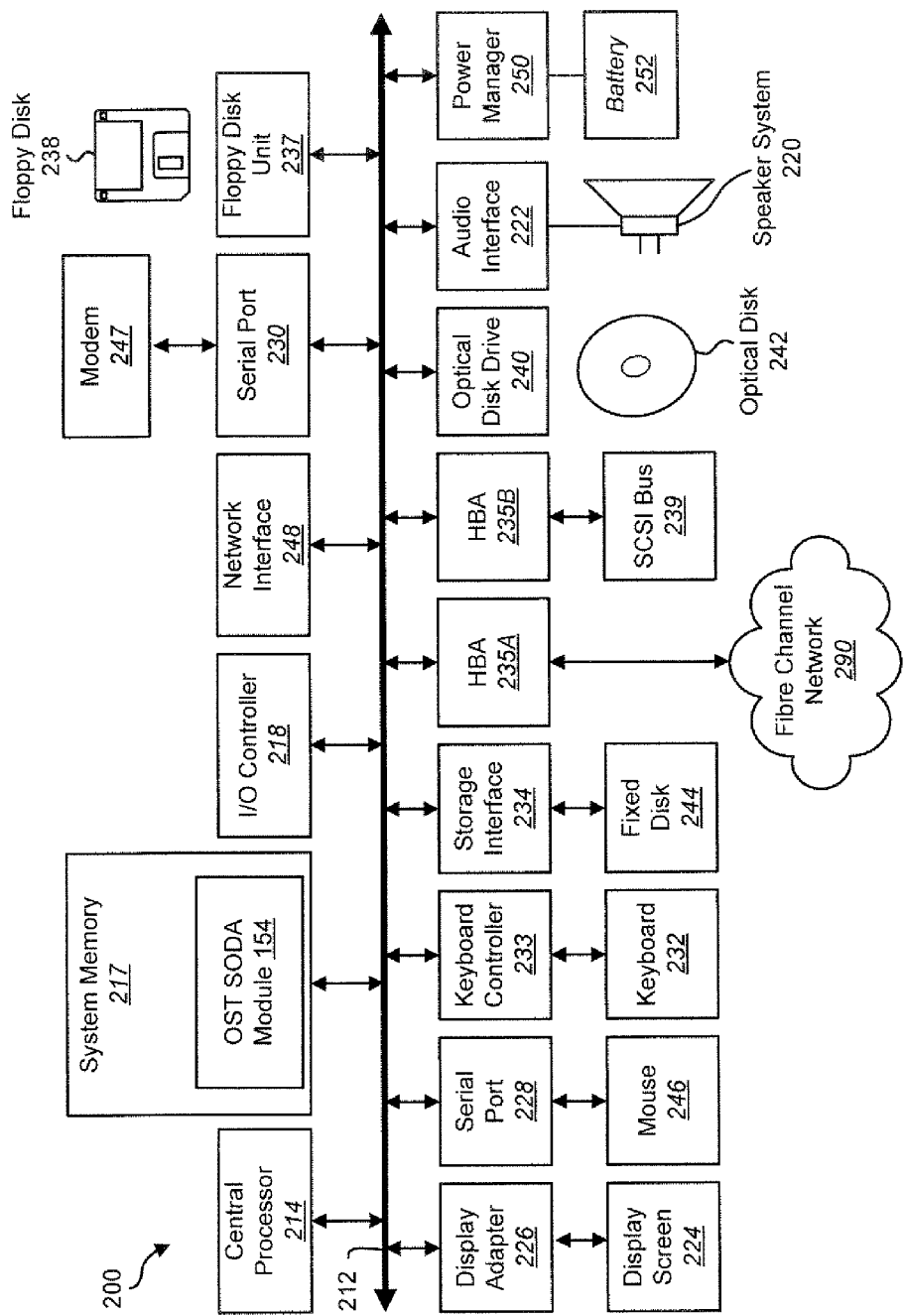
FIG. 2 depicts a block diagram of a computer system in accordance with an embodiment of the present disclosure.

With reference to computer system 200 of FIG. 2, modem 247, network interface 248, or some other method may be used to provide connectivity from one or more of client system 110 to network 150. Client system 110 may be able to access information on server 140A or 140B using, for example, a web browser or other client software. Such a client may allow client system 110 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between client 110, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an Internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, client 110 may be a smartphone, PDA, desktop computer, a laptop computer, a server, another computer, or another device coupled via a wireless or wired connection to network 150. Client 110 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between client 110 and a backup platform, a backup process, and/or storage. According to some embodiments, servers 140A and 140B may be platforms used for backing up and/or archiving data.

According to some embodiments Server 140A may be a media server and OST SODA Module 154 may be a global deduplication module that may provide data deduplication services. Deduplication services may be transparent to a server 140A and may allow a data protection application, such as Symantec NetBackup or BackupExec, to deduplicate a backup stream being written to cloud storage, while avoiding deficiencies of existing deduplication implementations.

Conventional deduplication method's metadata may be continually updated as objects are written to storage and deduplicated, and may be comingled with metadata used to restore an object. This may continually introduce the possibility of corruption, loss, or instability of deduplication metadata, and may compromise or completely obstruct object restore. This is highly significant given that the fundamental purpose of data protection is to permit object restore under any conditions. Embodiments of the present disclosure address this challenge by storing metadata used to restore a deduplicated object together with the deduplicated data. This may allow restoration of a backup data set, or a part of a backup data set, from a stable, deduplicated representation of the data set, without reference to deduplication metadata that may be subject to subsequent incremental modification or loss resulting from ongoing deduplication operations or system failure. These two constraints together may ensure that metadata needed to restore an object, may be as reliable and accessible as the stored data itself. As a consequence, if the deduplication engine or its embedded metadata is not available, due to loss or corruption, or absence from the restore environment, restorability of a backup data set may not be compromised.

Some existing deduplication implementations may be unable to deduplicate data written to the pre-existing storage configuration of a data protection application. The deduplication mechanism may not be applied to the existing storage configuration, instead, storage may be configured beneath the deduplication mechanism, or in conjunction with it, before data written to the storage can be deduplicated. This may be disruptive to the end user's environment, and is highly significant in an enterprise-scale context.

Embodiments of the present disclosure may provide deduplication for the existing storage configuration of a data protection application (DPA), without the need to reconfigure the DPA's view of the storage configuration. That is, the deduplication implementation may not require changes in the DPA, either in its static implementation, or in its dynamic view of the storage configuration.

Some existing deduplication implementations may be tightly coupled with the storage they control, with frequent storage accesses during deduplication operations, for example, metadata updates, or object deletion and associated space reclamation. This type of implementation may not be compatible with cloud storage due to the much higher network latency involved.

Embodiments of the present disclosure may perform operations pertaining to deduplication which may occur entirely on the DPA side of the WAN. This may accommodate the low throughput and high latency of cloud storage.

In some existing deduplication implementations, if an object is migrated to storage media not controlled by the same deduplication implementation, the object is always fully reassembled. This may require the entire data set to be transmitted to the target storage. Embodiments of the present disclosure address these issues.

Embodiments of the present disclosure may allow migration of a backup data set, after deduplication, to any disk media, without reassembly. This may improve performance when migrating large data sets over a WAN, as is common in data protection context.

According to some embodiments OST SODA Module 154 may comprise a filter component inserted in the storage stack, between the data protection application and storage driver. The filter component may generate fingerprints for units of data (e.g., hash keys for blocks of data in the backup data stream), and may send lookup requests via LAN (e.g., Network 150) to the monitor component (e.g., Monitors 125(1) . . . 125(n) and control monitor 120). The filter component may also instruct the monitor component to record fingerprints (e.g., hash keys) and the location of the corresponding blocks of data in backup data sets.

According to some embodiments, monitors 125(1) . . . 125(n) and control monitor 120 may comprise monitor components, including software running on a host known to one or more filter component instances (e.g., OST SODA Module 154) in a backup environment. The monitor may maintain deduplication history (e.g., in the form of a large table of hash key references). Each key may be associated with a block of data in a backup data set, and may be associated with dataSetId and offset. The backup data stream may not pass through the monitor, and the monitor may not control any storage for the purpose of holding backup data. According to some embodiments, monitors may be installed on a LAN, local to a client (e.g., a media server and/or a data protection application), and deduplication meta-operations may occur between a filter component (e.g., OST SODA Module 154) and the monitor (not, for example, between the filter component and storage).

A data set may be stored as a map and blocks of data that may be unique to this data set, at the moment each block is stored. The map may also contain pointers to blocks in previously-stored data sets. The map may be stored alongside the data blocks themselves, on the same storage (e.g., SAN Fabric 170). This may ensure that all information needed to restore an object is a) stable, once the object has been stored, and b) is as accessible as the data blocks. Note that metadata used for reading (i.e., reassembling or reflating) an object from storage, may be stored together with the data blocks, while metadata that assists deduplication, but which is not involved in restore operations, may be stored within a monitor. Loss of metadata within a monitor may affect deduplication efficiency, but has no effect at all on object restorability.

Deduplicated data sets (e.g., a sequence of backup data sets) may be self-referential, allowing data sets to be migrated to disk media or other storage without reassembly or reflation.

According to some embodiments, a component (e.g., OST SODA Module 154) may trap write operations to storage (e.g., devices 180 of SAN Fabric 170). A fingerprint (e.g., a hash key) may be generated for each successive block of data in a stream (e.g., using a hashing algorithm such as MD5 or SHA1). A lookup request may be sent via LAN (e.g., network 150) to a monitor component (e.g., a monitor for a domain such as Monitors 125 or a master or control monitor for global deduplication such as control monitor 120). The monitor may maintain a memory-resident data structure such as, for example, a table of (key, dataSetId, offset) tuples. If a key is found in the table, the corresponding (dataSetId, offset) may be returned, otherwise, 'not found' may be returned. According to some embodiments, no response may be necessary and a requesting filter may assume that the key has not been found after a configurable period of time without a response.

A filter component (e.g., OST SODA Module 154) may create a map object on storage, here called D.map, containing tuples (offset, refDataSetId, refOffset, length). Offset may be relative to the data set being stored. refDataSetId may identify the data set that contains the block, and refOffset may be the block's location in the referenced data set. length may be the length of data. If key lookup failed for a block, the block may be stored in the data object D.data, which may contain unique blocks belonging to the data set being stored (e.g., as of the time when each block was stored), and refDataSetId may refer to D.data. Otherwise, refDataSetId may refer to a previously-stored object Dn.data that may contain the block. Once the store operation is complete, the map object D.map may contain a pointer to every block of data in the backup stream.

According to some embodiments, a filter component (e.g., OST SODA Module 154) may trap a read operation to object D on storage. The filter component may index a map object D.map, and dereferences the appropriate pointer in the map. The relevant data may be read from the referenced object, which may be D.data, or another object Dn.data.

A filter component may maintain sufficient reference information, to ensure that a referenced block is not deallocated on storage if one or more references to it exist. Reference information may be maintained at various levels of granularity. For example, reference information may be maintained at a whole-object level. In this case, an object may only be deallocated on storage as a complete unit. In another example, reference information may be maintained at the block level. In this case, individual blocks of an object may be deallocated on storage.

Note that a monitor component and its key table may not involved in restore operations. A filter component may affect a restore operation solely by reading the object map D.map from storage, and objects referenced by D.map. Thus, metadata needed to restore an object may be stored alongside the object's data blocks, while metadata that assists deduplication while an object is being stored, may reside in a monitor. Loss or corruption of deduplication metadata in the monitor may have no effect whatever on object restore. A data protection application or other client may be unaffected by the presence or absence of a filter component in a stack used for data protection. Transparently to the client, a filter component may create D.map and D.data, and may restore D by indexing D.map to reference objects Dn.data. A filter component may deduplicate data written to an existing storage configuration. A client (e.g., a media server and/or a data protection application) may not be aware that the filter component is present. Operations on a monitor's fingerprint reference data structure (e.g., a hash key table) for key lookup and insert, may occur entirely on a LAN connection between a filter component and monitor component. No interaction with storage may be required. The architecture may therefore be compatible with cloud storage.

A data set may be migrated by copying a map object D.map, and blocks (or whole objects) referenced by D.map, with map entries modified to reference the migrated blocks or objects (rather than the source objects). It may not be necessary to reassemble the objects. This may be possible due to the self-referential nature of an appropriately defined set of objects. For example, if D.map references D.data, D1.data, D2.data, then the set of objects (D.map, D.data, D1.data, D2.data) may be self-referential. No metadata external to the objects may be needed to migrate the objects.

According to some embodiments, SODA (Secure Optimized Deduplication Assist) as described above with reference to OST SODA Module 154 and monitors 125 and control monitor 120 may be scaled to accommodate larger storage sizes than may be possible by using separate and individual monitors. By utilizing the unique capabilities of SODA it may be possible to implement a system allowing a massive global deduplication pool (e.g., utilizing nineteen servers running the monitoring software may scale to 9728 TB, utilizing more monitors may result in higher levels of scalability. Therefore, no inherent limit is designed into this approach. Levels of scalability may also depend on data transmission speeds). Embodiments may utilize cloud-based storage as a destination for deduplicated data and may maintain a scalable local database or other data structure to keep track of the data in a deduplication store. For example, assuming a 10:1 deduplication ratio, and a system scaled to a 9728 TB deduplication pool, that may yield a system capable of managing 100,000 TB of backed up data.

According to some embodiments, a filter component (e.g., OST SODA Module 154) may scan data as it is backed up. Each block may be analyzed to determine whether the data had previously been backed up. Unique data (i.e., not previously backed up) may be migrated to the cloud and the presence of this data may be used during subsequent backups.

A scalable database or other data structure containing fingerprints (e.g., hash keys) that have previously been backed up may be maintained at one or more data centers. When a backup is initiated at one of these sites, the database may be consulted and if a particular block of data's hash key is present in the database, then the block of data may be known to exist in the cloud deduplication store. Therefore, that block of data may be discarded rather than being stored. Data may not necessarily flow to and from the cloud at this point—a local lookup may be performed and the data, if it is determined to be new unique data, may be written locally. That local data, combined with deduplicated data that is present in the cloud deduplication store may represent the backed up data and the ability to restore.

Some embodiments may have the ability to scale a data structure or a database containing fingerprint information significantly. By leveraging the cloud as a globally available deduplication pool, the deduplication pool may grow to very large sizes and may be far more efficient for deduplication operations (in other words, the larger this pool becomes, the more likely that blocks will already exist and that deduplication operations performed against it will succeed.)

The SODA monitor may play only an advisory role (hence, SOD-Assist) and may not be involved at all in restoration of data. Therefore, once data has been deduplicated on its way to the cloud, restoration from any location may be possible restoration may be direct from cloud-based storage to a component on a media server and/or client (e.g., OST SODA Module 154 which may be implemented as a OST plug-in), not through a monitor.

SODA may be largely devoid of race conditions, instead, race conditions may be allowed to occur, if the consequence is only a modest loss of deduplication effectiveness, never data loss. For example, if two keys (i.e., references to a fingerprint or hash key) are added to a monitor key data structure, database, or table concurrently, one wins, the other loses, and the same block is stored twice. This may happens rarely and may have minimal impact. According to some embodiments, for World-Wide Data Deduplication (WWDD), a local monitor may be used for key lookups. This may be extended, in a straightforward way, to periodically forward local monitor key table updates to a SODA master monitor (e.g., control monitor 120). A SODA master monitor may consist of a SODA control monitor and some number of slave monitors (e.g., monitors 125). Note, the master monitor may not return its updates to the local monitors and a key table of the master may often be much larger than that of a local monitor. However, local SODA plug-ins (e.g., OST SODA Module 154) may still be able to leverage the master monitor's deduplication history. This may allow some duplicates to occur but may catch most of them.

SODA monitors that are participating in WWDD may need to know the identity of the SODA master (e.g., control monitor 120), and its credentials. The SODA master may persist its fingerprint data structures (e.g., tables), as any SODA monitor may. Loss of this metadata may not be critical; it may result in loss of deduplication history and hence duplicate data, until the history is rebuilt over time. There may be no data loss.

According to one or more embodiments, if not operating in WWDD mode, a SODA plug-in may communicate only with a local SODA monitor. In WWDD mode, a SODA plug-in may communicate with both the local monitor, and the master monitor. In other, embodiments, in WWDD mode, a SODA plug-in may communicate with only the master monitor or only the local monitor.

A SODA monitor may have one or more functions including:

1. A SODA monitor may maintain a fingerprint data structure (e.g., a hash key table (HKT)) According to one or more embodiments, this may be stored entirely in RAM and persisted to local disk in a lazy manner. Loss of fingerprint data may not be critical.

2. A SODA monitor may create and delete containers (e.g., through Open Storage Technologies (OST)).

The first time a data set references a container (each container may be an OST image), a SODA plug-in (e.g.—OST SODA Module 154) may send an addReference request to the monitor. This may be done only once per container. The monitor may create a hard link or other link in a shadow file system to represent the container. Upon data set deletion, the hard links for a data set may be deleted, if and only if the link count for the file that represents a container drops to 0. The container may then be deleted (e.g., through OST).

Container creation/deletion or other storage creation/deletion may be done in the monitor, not a plug-in, to reduce race conditions.

The reference count information (e.g., a shadow file system) may not be 'lossy', it may be available and correct. If it is not available, containers may not be deleted. The SFS may be backed up, and may also be rebuilt by a thorough scan of stored data sets (because each data set's map may contain all of its container references).

In WWDD mode, a local monitor may still be consulted for key lookups and adds from SODA plug-ins on a LAN. As discussed above, fingerprint data structure (e.g., HKT) updates from a local monitor may be periodically forwarded in an approximate manner, to a master monitor's fingerprint data structure (e.g., HKT). A local monitor may be used to improve lookup performance. However, some functionality (e.g., addReference calls, createContainer, and deleteImage calls), may be made to the master monitor, so that a global repository of container references may be maintained. No container reference information may be stored in local monitors. These calls (e.g., addReference calls, createContainer, and deleteImage calls) may be rare and latency may not affect performance.

A plug-in instance may send a lookup request to the local monitor. If a match is found, it is returned, otherwise, the local monitor may forward the lookup request to the master monitor. If a match is found (data was stored from another backup domain) it may be returned, but, the local monitor's HKT may not be updated. Thus, the local monitor HKT represents a history of data stored from this LAN only. This may be necessary to prevent matches from the master monitor overwhelming the local monitor's HKT.

According to some embodiments, a single monitor may manage 512 TB of post-deduplicated disk with 192 GB RAM (assumed maximum for this example). This may be sufficient for the typical LAN but for WWDD the required storage may be truly gigantic, so larger scaling may be required.

An exemplary SODA master may consist of a control node, and slave monitors (e.g., in this example 19 slave monitors), for a grand maximum of 9728 TB of post-deduplicated data. This is discussed in further detail below.

According to some embodiments, a fingerprint data structure may be implemented as a Hash Key Table (HKT). An exemplary HKT entry may be 20 bytes. With 160 GB allocated to the HKT table, there may be 8G entries in the table. From the 128-bit hash key, 33 bits form a subkey which may be used to index the table, the table entry contains the remaining 95 bits of the hash key.

According to one or more embodiments, to manage more post-deduplicated data, the table size may not increased, nor is the key range subdivided among multiple monitors. Instead, multiple monitors may contain the same size HKT, and as more data is stored, more and more keys with different key values, may produce subkey aliases (e.g., a subset of a hash key or a finger print used to index and/or retrieve a full fingerprint or hash key). The aliases may be distributed among the slave monitors. To distribute aliases across the slave monitors, the HKT in the control monitor may indicate which slave monitor(s) contain an alias. Furthermore, the number of slave monitors may be dynamically changed at any time, while lookups are in progress.

As an example, suppose there are 8 slave monitors. The control node HKT entry may also be 20 bytes, one byte may indicate how many possible aliases there are for this entry, and for each of the 8 slave monitors, two bytes of the full hash key may be represented. To do a lookup, the control node HKT may be indexed with the 33-bit subkey; then each of the eight 2-byte values may be compared to the corresponding 2 bytes of the search key. A match may indicate (with high probability) which slave monitor contains the key, the key may then be retrieved from that slave monitor and verified. To add a key, the control node HKT may be indexed with a subkey, then the 20-byte entry is searched for a slave monitor entry (the two bytes in this example) which is 0 (=empty), then the key may then be sent to that slave monitor and the control node HKT entry may be updated.

According to at least one embodiment, a minimum field size to usefully identify a key (approximately, with a reasonable chance of success) in the control node HKT entry may be one byte, in that case, given one byte reserved for the count of slave monitors, there may be 19 bytes remaining for a maximum of 19 slave monitors. If each slave can manage 512 TB, this may be a grand total of 9728 TB, post-deduplication. Assuming a deduplication ratio of about 10:1, this may amounts to approximately 100,000 TB of backup data. In this example, this may be a maximum that may be managed by one WWDD domain, within which deduplication will occur. In this example, it may be possible to create any number of such domains, but with no deduplication across them.

Assuming 19 slave monitors, and a deduplication pool of 9728 TB, should the amount of unique data held in the deduplication pool exceed the amount of key space, then deduplication effectiveness may decline as follows: The oldest data may be allowed to fall off of the deduplication key space in favor of the new information. In the real world, this should result in minimal impact on deduplication operations since data that is oldest, is probably not being referred to during new data writes and does not impact the deduplication of the current write operation.

In this manner, the amount of data that can be stored may be unlimited. Deduplication effectiveness may be retained over the most recently stored data—up to 100,000 TB in this example.

As discussed above, a Shadow File System (SFS) of hard links in the monitor may represent references from data sets to containers. The SFS may be distributed across slave monitors by mounting an SFS from each slave monitor on the control monitor. Other methods may be used.

According to at least one embodiment, there are few aliases (different key, same subkey) but they may occur with some frequency as a table approaches capacity. Aliases may be handled effectively for WWDD in several different ways. In one host (e.g., monitor), a max fingerprint data structure size (e.g., a HKT size of 256 GB RAM) may be limited. Multiple monitors may thus be used for WWDD with aliases distributed among the monitors.

In an exemplary embodiment, suppose that 128-bit MD5 is used to generate a hash key and you use the first 33 bits as subkey. In this example, because may store a lot more than 512 TB, we may eventually have multiple collisions for each 33 bit subkey value, and we may want to distribute them among the monitors. This may be implemented by inserting an alias in any monitor that has an empty slot for that subkey. To lookup, put more bits of the MD5 I nth econtrol node HKT entry for this subkey. For 8 monitors, you may use 2 bytes. If that 2 bytes, for any of the 8 monitors, differs from the same 2 bytes of the key being searched, you may have a definite miss for that monitor. If it matches, you have a possible complete match. If 2 of the 8 monitors apparently match, you may read the full HKT entry from just those 2, and verify if either is a full match. For greater numbers of monitors in another example, change the sizes of subkeys. For example, make the subkey 4 bytes, with 1 byte for the slave monitor subkey (e.g., up to 19 monitors). In this example, assume a full key is 8 bytes. When looking up exemplary key "0xab96fe335c7f9 db2": a Subkey may be "ab96fe33". A control node HKT may be indexed in this example with "ab96fe33". A 20-byte entry may be read (e.g., first byte=3), there are 3 aliases (keys with this subkey) among the 19 monitors. The remaining 19 bytes of the HKT entry in this example may be "0,0,0,5c,5c,0,0,0,72,0,0,0,0,0,0,0,0,0,0". The 4th and 5th entries match the 5th byte of the full key, and may be possible matches. The 9th entry doesn't match and is a definite miss. Slave monitors 3 and 4 may be queried to get the full key at index ab96fe33. The key from 3 may be ab96fe335c7f8 db3. This doesn't fully match. The key from 4 may be ab96fe335c7f9 db2 and is a match.

To insert an alias in a slave monitor, the control node HKT entry shows that the slot for monitors 0, 1, 2, 5, . . . are free.

Another method for this includes broadcasting a lookup from the control node to all monitors. According to some embodiments, this may work in constant time given sufficient processing power and sufficient network throughput. A thread per slave running on a dedicated CPU in the control node may query each slave concurrently. This may be much faster as an entire system approaches capacity. According to some embodiments, broadcasting to all slave monitors may eliminate a need for a control monitor.

According to some embodiments, a key range per slave monitor may not be divided up. Therefore, as you add more slaves, all that happens is that the overall system capacity increases and you do not have to adjust a key range. In SODA, that means deduplication becomes more effective. Also if you drop a slave, because of the way SODA works that monitor's aliases may be lost and some deduplication effectiveness in future may be lost, but data sets already deduplicated aren't affected. In the above example with 19 monitors, deduplication may scale up to almost 10 PB. This may be a temporary reduction in efficiency as it may self-heal over time and may add the missing keys as data is backed up in the new configuration Embodiments of the present disclosure may deduplicate an existing backup environment with no changes to storage units, policies, storage configuration. Deduplication may be added to any storage added to an environment and may then offer deduplication to any data that is written after the addition to the environment. Data that has previously been written to the environment may remain unchanged. Deduplication as implemented with a filter component and one or more monitors may be application-independent (e.g., any application that supports OST). Such deduplication may be storage independent (e.g., any storage that supports OST) and loss of SODA metadata may have no effect on data availability.

According to some embodiments, installation may have a minor impact. Installation may involve only putting monitor appliance on network, pushing a few small binaries to clients (e.g., media servers). According to some embodiments, an existing server such as, for example, a media server, may be used as a monitor.

Due to the above approach, storage configuration of SODA may be identical to a client application predefined configuration (e.g., backup application configuration)—SODA may not change it at all (SODA may not control storage). Additionally, implementations of SODA may not fragment data beyond the minimum necessitated by deduplication.

According to one or more embodiments an exemplary monitor may contain a 256 GB of RAM which may map 800 TB of data per SODA appliance (post-deduplication). Another exemplary configuration may include 8 cores, 4 NIC's, 96 GB RAM and may maps 256 TB of data post-deduplication. A monitor may need minimal attached disk (e.g., <1 TB) for persisting deduplication tables.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, OST SODA module 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an Internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
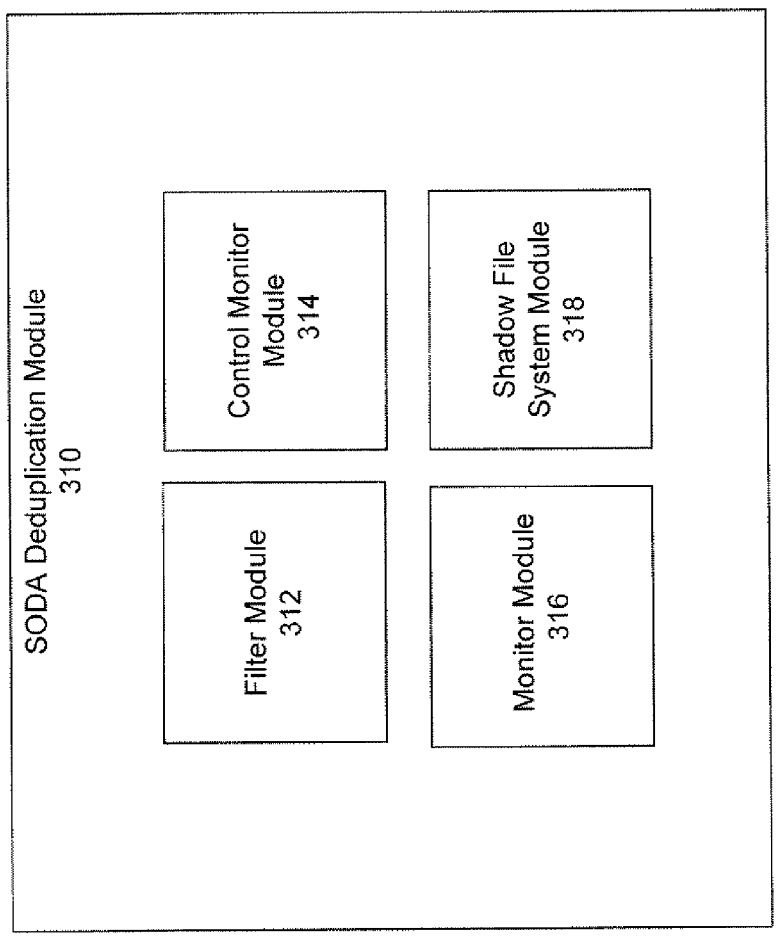
FIG. 3 shows a module for data deduplication in accordance with an embodiment of the present disclosure.

Referring to FIG. 3, there is shown a data deduplication module 310 in accordance with an embodiment of the present disclosure. As illustrated, the data deduplication module 310 may contain one or more components including Filter Module 312, Control. Monitor Module 314, Monitor Module 316, and Shadow File System Module 318.

Filter Module 312 may comprise a filter component inserted in a storage stack (e.g., between a data protection application and storage driver). Filter Module 312 may generate fingerprints for units of data (e.g., hash keys for blocks of data in the backup data stream), and may send lookup requests via LAN (e.g., Network 150) to the monitor component (e.g., Monitors 125(1) . . . 125(n) and control monitor 120). Filter Module 312 may also instruct a monitor component to record fingerprints (e.g., hash keys) and the location of the corresponding blocks of data in backup data sets.

Filter Module 312 may create a map object on storage, here called D.map, containing tuples (offset, refDataSetId, refOffset, length). Offset may be relative to the data set being stored. refDataSetId may identify the data set that contains the block, and refOffset may be the block's location in the referenced data set. length may be the length of data. If key lookup failed for a block, the block may be stored in the data object D.data, which may contain unique blocks belonging to the data set being stored (e.g., as of the time when each block was stored), and refDataSetId may refer to D.data. Otherwise, refDataSetId may refer to a previously-stored object Dn.data that may contain the block. Once the store operation is complete, the map object D.map may contain a pointer to every block of data in the backup stream.

Control Monitor Module 314 may be a master or control monitor for global deduplication. According to some embodiments, monitors (control and/or slave or domain monitors) may maintain deduplication history (e.g., in the form of a large table of hash key references). Each key may be associated with a block of data in a backup data set, and may be associated with dataSetId and offset. The backup data stream may not pass through the monitor, and the monitor may not control any storage for the purpose of holding backup data. According to some embodiments, monitors may be installed on a LAN, local to a client (e.g., a media server and/or a data protection application), and deduplication meta-operations may occur between a filter module and the monitor (not, for example, between the filter component and storage).

Control Monitor Module 314 may maintain a memory-resident data structure such as, for example, a table of (key, dataSetId, offset) tuples. If a key is found in the table, the corresponding (dataSetId, offset) may be returned, otherwise, 'not found' may be returned. According to some embodiments, no response may be necessary and a requesting filter module may assume that the key has not been found after a configurable period of time without a response.

A data set may be stored as a map and blocks of data that may be unique to this data set, at the moment each block is stored. The map may also contain pointers to blocks in previously-stored data sets. The map may be stored alongside the data blocks themselves, on the same storage (e.g., SAN Fabric 170). This may ensure that all information needed to restore an object is a) stable, once the object has been stored, and b) is as accessible as the data blocks. Note that metadata used for reading (i.e., reassembling or reflating) an object from storage, may be stored together with the data blocks, while metadata that assists deduplication, but which is not involved in restore operations, may be stored within a monitor. Loss of metadata within a monitor may affect deduplication efficiency, but has no effect at all on object restorability.

Monitor Module 316 May

A SODA monitor may have one or more functions including:

1. A SODA monitor may maintain a fingerprint data structure (e.g., a hash key table (HKT)) According to one or more embodiments, this may be stored entirely in RAM and persisted to local disk in a lazy manner. Loss of fingerprint data may not be critical.

2. A SODA monitor may maintain references to containers from data sets. Loss of this may be critical.

3. A SODA monitor may create and delete containers (e.g., through Open Storage Technologies (OST)).

Shadow File System Module 318 may be used by a monitor or another component to create a hard link or other link in a shadow file system to represent a container. Upon data set deletion, the hard links for a data set may be deleted, if and only if the link count for the file that represents a container drops to 0. The container may then be deleted (e.g., through OST). The reference count information (e.g., a shadow file system) may not be 'lossy', it may be available and correct. If it is not available, containers may not be deleted. The SFS may be backed up, and may also be rebuilt by a thorough scan of stored data sets (because each data set's map may contain all of its container references).

A Shadow File System (SFS) of hard links in the monitor may represent references from data sets to containers. The SFS may be distributed across slave monitors by mounting an SFS from each slave monitor on the control monitor. Other methods may be used.

Figure 4:
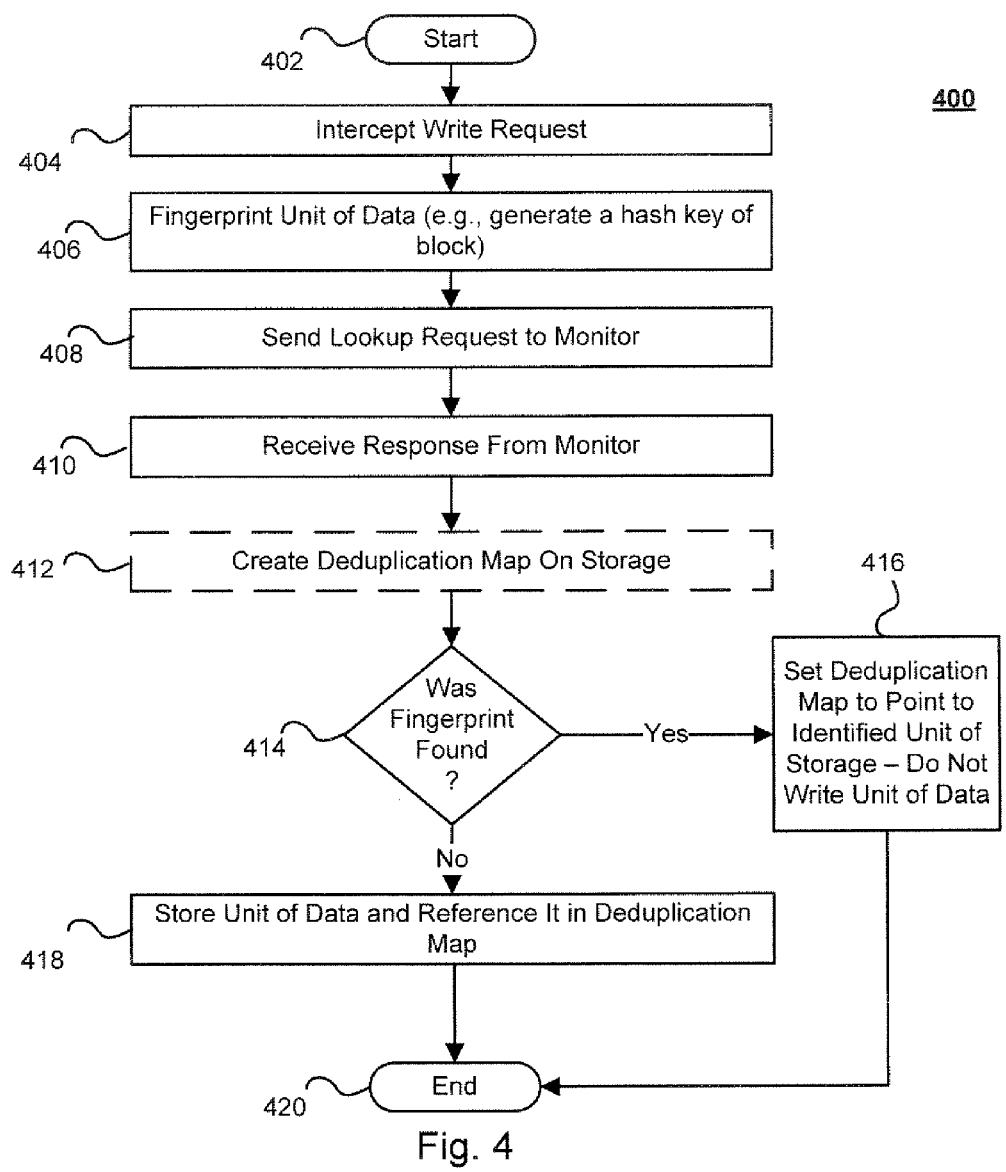
FIG. 4 depicts a method for data deduplication in accordance with an embodiment of the present disclosure.

Referring to FIG. 4, there is depicted a method 400 for data deduplication in accordance with an embodiment of the present disclosure. At block 402, the method 400 may begin.

At block 404, write request may be intercepted. According to some embodiments, it may be intercepted by a module (e.g., a plug-in) on a client such as, for example, a media server.

At block 406, a fingerprint may be generated for a unit of data associated with the write request. For example, a hash key may be generated.

At block 408, a lookup request may be sent to a monitor. The lookup request may be sent to a control monitor or may be broadcast directly from a component on a client (e.g., a plug-in) to a plurality of monitors.

At block 410, a response may be received from one or more monitors. According to some embodiments, a monitor may respond with a not found message if the lookup request does not match any fingerprints or portions of fingerprints (e.g., sub keys) in storage associated with that monitor. A monitor may respond with an indication of a match on a key and/or a sub-key if a match is identified by the monitor. According to some embodiments, no response may be necessary and a requesting filter may assume that the key has not been found after a configurable period of time without a response.

At block 412, a deduplication map may be created on storage if this is a first write to a data set. A data set may be stored as a map and blocks of data that may be unique to this data set, at the moment each block is stored. The map may also contain pointers to blocks in previously-stored data sets. The map may be stored alongside the data blocks themselves, on the same storage (e.g., SAN Fabric 170). This may ensure that all information needed to restore an object is a) stable, once the object has been stored, and b) is as accessible as the data blocks, Note that metadata used for reading (i.e., reassembling or reflating) an object from storage, may be stored together with the data blocks, while metadata that assists deduplication, but which is not involved in restore operations, may be stored within a monitor. Loss of metadata within a monitor may affect deduplication efficiency, but has no effect at all on object restorability.

At block 414, a determination may be made as to whether a fingerprint has been found. For example, multiple responses may be received from a plurality of monitors. A full fingerprint may be requested from one or more monitors to determine whether an alias matches a fingerprint. If a match is found, the method may continue at block 416. If no match is found, the method may continue at block 418.

At block 416, the previously stored unit of data may be referenced in a deduplication map and may not store the unit of data associated with the write request.

At block 418, the unit of data associated with the write request may be written to storage and may reference the stored unit of data in a deduplication map.

At block 420, the method 400 may end.

Figure 5:
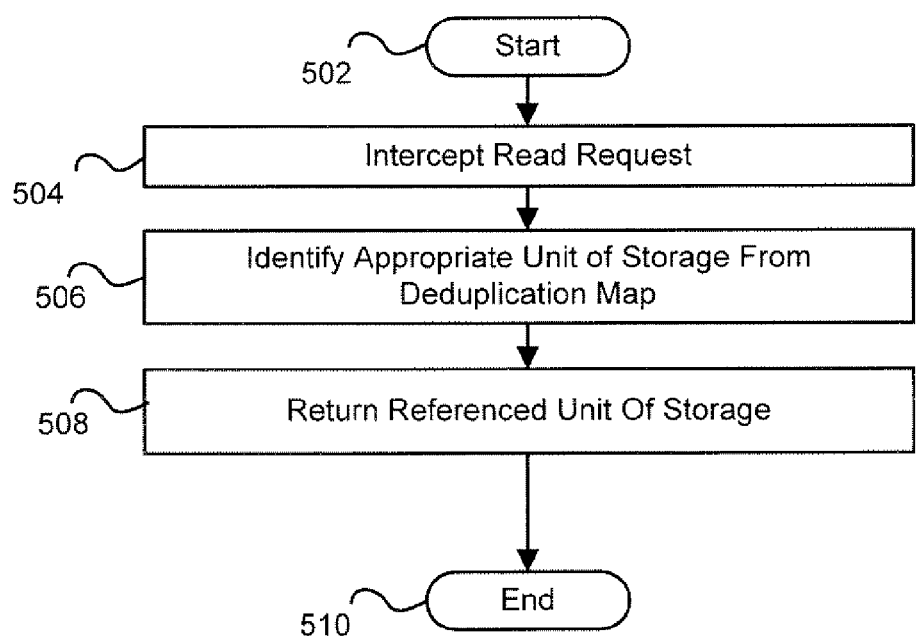
FIG. 5 depicts an alternative method for data deduplication in accordance with an embodiment of the present disclosure.

Referring to FIG. 5, there is depicted a method 500 for data deduplication in accordance with an alternative embodiment of the present disclosure. At block 502, the method 500 may begin.

At block 504, a read request may be intercepted.

At block 506, a deduplication map associated with the storage (e.g.—stored with the storage) may be accessed to identify an appropriate unit of storage. The deduplication map may contain a pointer or other reference to the appropriate unit of storage and may be indexed by a fingerpint, hash key, or a subset of a fingerprint or hash key.

At block 508, the referenced unit of storage may be returned.

At block 510, the method 500 may end.

Figure 6:
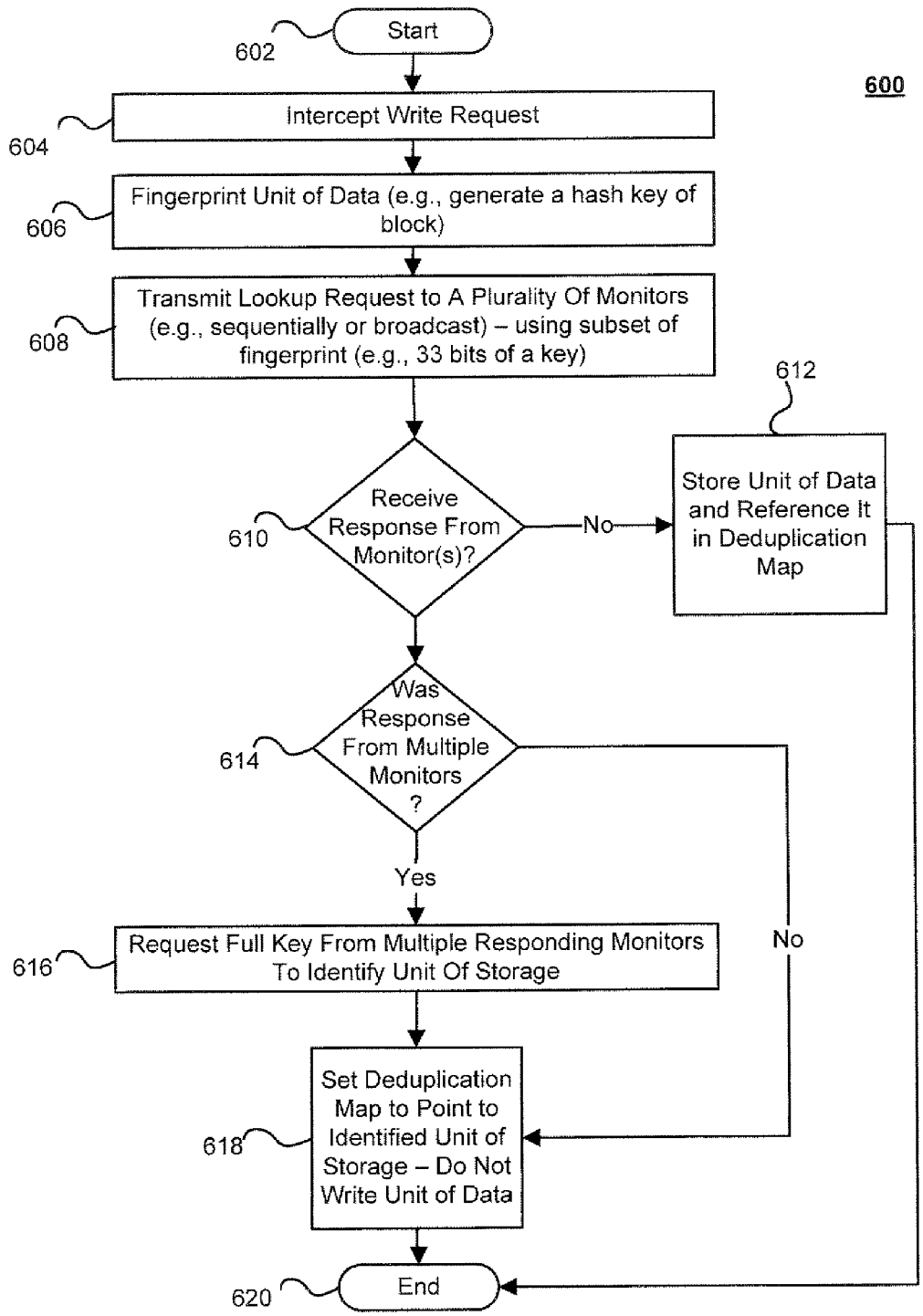
FIG. 6 depicts an alternative method for data deduplication in accordance with an embodiment of the present disclosure.

Referring to FIG. 6, there is depicted a method 600 for data deduplication in accordance with an alternative embodiment of the present disclosure. At block 602, the method 600 may begin.

At block 604, a write request may be intercepted. According to some embodiments, it may be intercepted by a module (e.g., a plug-in) on a client such as, for example, a media server.

At block 606, a fingerprint may be generated for a unit of data associated with the write request. For example, a hash key may be generated.

At block 608, a lookup request may be sent to a monitor. The lookup request may be sent to a control monitor or may be broadcast directly from a component on a client (e.g., a plug-in) to a plurality of monitors.

At block 610, it may be determined whether a response has been received. If a response has been received the method may continue at block 614. According to some embodiments, no response may be necessary and a requesting filter may assume that the key has not been found after a configurable period of time without a response. If no response was received or if all responses received indicate that the fingerprint or portion of a fingerprint was not found, the method may continue at block 612.

At block 612, the unit of data (e.g., a container or a block) associated with the write request may be written to storage and the method may reference the stored unit of data in a deduplication map.

At block 614, a determination may be made as to whether a response was received from one or more monitors. A monitor may respond with an indication of a match on a key and/or a sub-key if a match is identified by a monitor. If multiple monitors respond with a match (e.g., on subkeys which are aliases) the method may continue at block 616. If only a single response is received, the method may verify the full key and continue at block 618.

At block 616, the full key may be requested from the monitors that responded with a match and the matching full key and the appropriate unit of storage to reference may be identified.

At block 618, the previously stored unit of storage may be referenced in a deduplication map and the unit of data associated with the write request may not be written to storage.

At block 620, the method 600 may end.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

At this point it should be noted that data deduplication in accordance with the present disclosure as described above typically involves the processing of input data and the generation of output data to some extent. This input data processing and output data generation may be implemented in hardware or software. For example, specific electronic components may be employed in a cloud based content monitoring module or similar or related circuitry for implementing the functions associated with data deduplication in accordance with the present disclosure as described above. Alternatively, one or more processors operating in accordance with instructions may implement the functions associated with data deduplication in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for data deduplication comprising:
   receiving a write request for a block of data;
   generating a fingerprint for the block of data;
   transmitting, using at least one computer processor, a portion of the fingerprint to a plurality of deduplication monitors;
   performing the write request using an indicator indicating a location of a previously stored block of data having a fingerprint matching the transmitted portion of the fingerprint if a response indicating the previously stored block of data having the fingerprint matching the transmitted portion of the fingerprint is received from at least one of the plurality of deduplication monitors; and
   performing the write request using the block of data if no response is received.

2. The method of claim 1, wherein transmitting at least a portion of the fingerprint to a plurality of deduplication monitors comprises broadcasting at least a portion of the fingerprint to a plurality of deduplication monitors.

3. The method of claim 1, wherein transmitting at least a portion of the fingerprint to a plurality of deduplication monitors comprises sending at least a portion of the fingerprint to a control monitor and transmitting at least a portion of the fingerprint from a control monitor to a plurality of deduplication monitors.

4. The method of claim 1, wherein a plurality of responses are received from at least two of the plurality of deduplication monitors.

5. The method of claim 4, further comprising requesting a full fingerprint to verify the block of data is stored from the at least two of the plurality of deduplication monitors.

6. The method of claim 1, wherein the fingerprint comprises a hash key.

7. The method of claim 1, wherein each of the plurality of deduplication monitors comprises a monitor for a data domain and data deduplication is provided across a plurality of domains.

8. The method of claim 1, wherein the fingerprint is generated and transmitted from a client plug-in.

9. The method of claim 8, wherein the client comprises a media server.

10. The method of claim 1, wherein the indicator indicating a location of a previously stored block of data allows data written with the indicator to be migrated or restored without use of deduplication metadata.

11. The method of claim 1, wherein the indicator indicating a location of a previously stored block of data allows data written with the indicator to be migrated or restored without use of one or more of the plurality of deduplication monitors.

12. The method of claim 1, wherein implementation of deduplication is capable of being performed on storage to provide deduplication of data written to the storage after implementation without affecting existing data on the storage.

13. The method of claim 1, wherein the number of the plurality of deduplication monitors is configurable.

14. The method of claim 1, wherein loss of one or more deduplication components does not affect data protection.

15. The method of claim 1, wherein each of the plurality of deduplication monitors maintains a table of one or more fingerprints.

16. The method of claim 1, the write request comprises a portion of a stream of backup data.

17. The method of claim 1, wherein a counter is maintained for a unit of storage referenced by other storage and the unit of storage is deallocated only in the event the counter indicates no other storage is referencing the unit of storage.

18. At least one non-transitory processor readable storage medium for storing a computer program of instructions configured to be readable by at least one processor for instructing the at least one processor to execute a computer process for performing the method as recited in claim 1.

19. An article of manufacture for data deduplication, the article of manufacture comprising:
   at least one non-transitory processor readable medium; and
   instructions stored on the at least one medium;
   wherein the instructions are configured to be readable from the at least one medium by at least one processor and thereby cause the at least one processor to operate so as to:
   receive a write request for a block of data;
   generate a fingerprint for the block of data;

transmit a portion of the fingerprint to a plurality of deduplication monitors;

perform the write request using an indicator indicating a location of a previously stored block of data having a fingerprint matching the transmitted portion of the fingerprint if a response indicating the previously stored block of data having the fingerprint matching the transmitted portion of the fingerprint is received from at least one of the plurality of deduplication monitors; and perform the write request using the block of data if no response is received.

20. A system for data deduplication comprising:

one or more processors communicatively coupled to a network; wherein the one or more processors are configured to:

receive a write request for a block of data;

generate a fingerprint for the block of data;

transmit a portion of the fingerprint to a plurality of deduplication monitors;

perform the write request using an indicator indicating a location of a previously stored block of data having a fingerprint matching the transmitted portion of the fingerprint if a response indicating the previously stored block of data having the fingerprint matching the transmitted portion of the fingerprint is received from at least one of the plurality of deduplication monitors; and perform the write request using the block of data if no response is received.

* * * * *